United States Patent [19]

Masaryk

[11] 4,158,685
[45] Jun. 19, 1979

[54] FOAMED INSULATION REFRACTORY

[75] Inventor: Joseph S. Masaryk, Castro Valley, Calif.

[73] Assignee: Kaiser Aluminum & Chemical Corporation, Oakland, Calif.

[21] Appl. No.: 887,088

[22] Filed: Mar. 16, 1978

[51] Int. Cl.$^2$ ............................................. C04B 43/00
[52] U.S. Cl. .................................. 264/43; 106/40 R; 106/64; 106/71; 264/86
[58] Field of Search ....................... 264/86, 43, 63, 42; 106/40 R, 71, 86, 104, 64

[56] References Cited
U.S. PATENT DOCUMENTS

| | | | |
|---|---|---|---|
| 3,232,772 | 2/1966 | Hilton et al. | 106/71 |
| 3,508,940 | 4/1970 | Webb | 106/64 |

FOREIGN PATENT DOCUMENTS 1124514  8/1968  United Kingdom ...................... 106/71

*Primary Examiner*—Robert F. White
*Assistant Examiner*—John A. Parrish
*Attorney, Agent, or Firm*—Paul E. Calrow; Malcolm McQuarrie

[57] ABSTRACT

A foamed insulating refractory shape is made by: (1) preparing a slip of water, deflocculating agent, refractory aggregate, at least 7.5% by weight cement, and, optionally, clay; (2) forming a foam of water, foaming agent, and air having a density not over about 5 lbs per cubic foot (80 g/l); (3) admixing the slip and the foam to form a foamed slurry with a viscosity between 1000 and 30,000 centipoises, the amount of water in the slip being adjusted to yield the desired viscosity in the foamed slurry; (4) pouring the foamed slurry into molds; (5) curing the pieces so formed at a temperature not over about 72° F. (about 22° C.) for about 16 to 24 hours; (6) drying the pieces at a temperature not over about 200° F. (about 93° C.); and (7) firing the pieces. The method of this invention produces insulating refractory shapes with higher strength-to-weight ratios than those produced by prior art methods.

9 Claims, No Drawings

FOAMED INSULATION REFRACTORY

BACKGROUND OF THE INVENTION

This invention concerns refractories and particularly insulating refractories.

Insulating refractories are known and are generally refractories with relatively high porosities (e.g., 50 volume percent or more). In other words, insulating refractory shapes are made by creating holes or voids within the shape to provide thermal insulation.

It is conventional practice today in producing most insulating refractory shapes to admix with the refractory material a substance, for example sawdust, which will burn out during firing and leave voids.

It is also known to form insulating refractories by incorporating air, for example in the form of a foam, into a slip or slurry of refractory particles, for example as set forth in U.S. Pat. Nos. 2,292,011, 3,232,772, and British Pat. No. 1,124,514. One of the main problems in this approach to producing insulating refractories is the stability of the foamed slurry. If it is exceedingly unstable, it may even collapse before the refractory shape is formed. In any case, it is essential that the foamed slurry maintain its structure and not collapse before it has dried and formed a semi-permanent, rigid structure. Also, the foamed slurry must not crack during the setting and drying steps.

(In this specification, the term "slip" refers to the mixture of water and solid ingredients, with or without a deflocculant, before foaming or aeration; the term "foam" refers to the air/water mixture, including a foaming agent, often referred to in the industry as a "preformed foam"; and the term "foamed slurry" refers to the mixture of "slip" and "foam"—sometimes referred to in the industry as "foamed slip"—and also, in discussing the background of the invention, to a "slip" which has been aerated in situ, for example by whipping in air.)

One solution to foamed slurry stability is to add an organic binder such as starch or polyvinyl alcohol to strengthen the foamed slurry. However, this has the disadvantage that foamed slurries containing such organic binders require a relatively long drying time, a matter of days, which is disadvantageous in mass production.

The present invention is directed toward the solution of the problem of producing a foamed insulating refractory shape which has a high strength-to-weight ratio and which is adapted to being made on a mass production scale.

SUMMARY OF THE INVENTION

It has now been found, according to this invention, that an insulating refractory shape of improved strength-to-weight ratio can be made by: (a) preparing a slip of water, deflocculating agent, finely divided solid refractory particles, and binder; (b) preparing a foam of water, air, and foaming agent; (c) admixing the slip and the foam to produce a foamed slurry; (d) casting the slurry into molds; (e) curing and (f) drying the cast pieces so formed; and (g) firing the pieces, if: (1) the slip consists essentially of at least 7.5% cement, from 0 to 50% clay, the balance of the solid ingredients being refractory aggregate all of which passes a 28 mesh screen, all percentages being by weight and based on the total weight of dry solid ingredients, and sufficient water to produce, when mixed with the foam, a foamed slurry having a viscosity of from 1000 to 30,000 centipoises; (2) the foam has a density of not over about 5 pcf; (3) the slip and the foam are admixed in the proportion of from 0.25 volume to 3 volumes of foam for each volume of slip; (4) the cast foamed slurry is cured at a temperature of not over about 72° F. (about 22° C.) for from 16 to 24 hours and then (5) dried at a temperature of not over about 200° F. (about 93° C.).

DETAILED DESCRIPTION

One way to conceptualize the present invention is to imagine the foamed slurry to have been poured into a mold one foot on a side, forming a block of one cubic foot volume. The question to be considered is: What are the relative amounts of solid material, water, and air in this cubic foot?

Since air has substantially no weight and the water will be removed upon drying, the weight of the finished refractory shape (in other words, its density in pounds per cubic foot—pcf) is attributable to the solid materials in the foamed slurry. Since, in many cases, some of these solids will lose weight, due to loss of water or other components, during the firing operation, the weight of the solid ingredients in the foamed slurry will not be exactly equal to the weight (per cubic foot) of the fired refractory, but it is well within the skill of one versed in the art to make the necessary calculations, given the characteristics of the raw materials to be used and the desired density for the final fired refractory shape. Also, it will be understood that usually the cast foamed slurry will undergo drying and firing shrinkage and that these must be taken into account in relating the foamed slurry density to the desired density of the fired product. Generally, insulating refractories produced by this method will have final fired densities ranging from as low as 20 pcf (0.3 g/cc) up to 100 pounds pcf (1.6 g/cc), or even higher, although this is generally considered the upper limit of "insulating" refractories. In any case, the choice of the density of the finished refractory is up to the producer.

Having determined the amount of solid materials in the cubic foot of foamed slurry under consideration, the next question is: How much water should be present? This leads to the first discovery of the present invention: In order to achieve maximum stability in the foamed slurry, the amount of water in it should be kept to a minimum, consistent with producing a foamed slurry having a viscosity of between 1000 and 30,000, preferably between 5000 and 12,000, centipoises. This viscosity range results from the fact that, while the water content must be held to a minimum, the foamed slurry must be of low enough viscosity so that it can be poured into molds.

It will be understood that lower viscosity implies more water in the foamed slurry. It has been found that denser foamed slurries (i.e., those with high solids content) can tolerate more water without collapsing. Thus, the broad range of viscosities given covers foamed slurries of different solids contents. The narrower range given (5000 to 12,000 centipoises) is the preferred operating range for all foamed slurries. When operating near the upper end of the viscosity range (near 30,000 centipoises) it may be necessary to mechanically place the foamed slurry in the molds.

One of the interesting sidelight discoveries of the present invention is that the optimum amount of water used per cubic foot of foamed slurry is roughly constant no matter how much solid material is in the cubic foot, being about 0.18 (± about 20%) cubic foot or about 11 (±2) pounds per cubic foot of foamed slurry (0.18±0.03 g of water per cc of foamed slurry). Since the amount of water per cubic foot of foamed slurry is approximately constant, it will be evident that the amount of water per weight of solid material will be less in a foamed slurry, and hence also in the underlying slip (see discussion below), used to make higher density refractories. This is completely contrary to normal slip casting procedures, where it is assumed that a single, optimum amount of water exists which will be "best" for any given slip. In other words, the slips used in this invention are not necessarily made to have the optimum deflocculation, as is done in slip casting.

Once the total amount of water to be used has been determined, the question remains: How should this amount of water be divided between the slip and the foam? First, it may be pointed out that all the water could be placed in the slip, which would mean that the foam would have to be formed in the slip itself, for example by whipping the slip or by generating a gas in it. While this method is known, it has several disadvantages, the main one of which is that it is exceedingly time and energy consuming; also, it is difficult to control the final density of the refractory since there is no direct measure of the amount of air placed in the slip. It is also difficult to obtain, by this method, a foamed slurry of uniform characteristics. Second, at the opposite extreme, it is possible to place all the water in the foam, thus adding dry solid ingredients to the foam. Again, this method is known, but it results in forming a very poor foamed slurry, the solids tending to ball up and agglomerate rather than distributing themselves evenly throughout the water films of the foam. The net result is a very weak final product.

Having concluded that some of the water should be in the slip and some in the foam, we come to the second discovery of this invention: The strongest refractories are formed when the water in the foam is kept to a minimum. This means the foam will contain less than 5, preferably less than 3, pounds of water per cubic foot of foam (less than 80, preferably less than 48, g/l). A density of 2 pcf (32 g/l) is a reasonable value for the density of the foam. While lesser amounts of water could be used in the foam, such foams tend to be unstable and as a practical matter it will prove very difficult to form foams of less than 1 pcf (16 g/l) density.

While the preceding conceptualized discussion of a single cubic foot of foamed slurry may aid in understanding the invention, the producer of an insulating refractory shape wants to know how to proceed step by step in his manufacturing operation.

From this point of view, the first step is the formation of the slip. The slip will contain the dry ingredients and, based on the total weight of dry ingredients, from about 30 to 40 weight percent water, the exact amount of water being determined, as set forth above, by that necessary to achieve the specified viscosity in the final foamed slurry. It will generally be desirable that the slip have as low a viscosity as possible, so that it will mix readily with the foam, and accordingly it will customarily contain a deflocculating agent, as is well known in the art.

The principal solid ingredient will be refractory aggregate. This may be any one or more of refractory grog, kyanite, calcined clay, bauxite, alumina, or any other refractory aggregate. The exact composition chosen will be dictated primarily by the refractoriness desired in the finished product, as will readily be understood by those skilled in the art. There is no limitation on the amount of any type of aggregate; for example, the aggregate may be all calcined flint clay. In any case, the refractory aggregate will all pass a 28 mesh screen. The finer the aggregate the stronger the resulting shape, but coarser aggregates yield better thermal shock resistance.

The slip may contain up to 50 weight percent, based on the total weight of the dry ingredients, of clay.

An extremely important dry ingredient is the binder, which must permit fast drying of the cast foamed slurry, not interfere with the stability of the foamed slurry (i.e., must not cause it to collapse), while at the same time providing strength in the dried shape. This leads to the third discovery of the present invention: That to achieve these objectives the cement must be an inorganic cement such as Portland cement or calcium aluminate cement. More specifically, the binder can not be an organic material such as starch, gum, polyvinyl alcohol and the like. These cause extremely slow drying.

The choice of cement depends on the refractoriness desired in the final product, Portland cement being the least refractory of the cements mentioned and high alumina calcium aluminate cement, such as that sold by the Aluminum Company of America under the trade name "CA-25," being the most refractory. It has been discovered that there must be present at least 7.5 weight percent, based on the total weight of dry ingredients, of the cement; 10% has been found to be a reasonable amount. While there must be a certain minimum amount of the cement present in order to provide adequate strength in the foamed refractory, there is no upper limit. While it would be possible to make a foamed refractory entirely of cement, such a procedure is not very practical because of the poor refractoriness of a shape made entirely of cement, not to mention its expense. Accordingly, about 30% cement will be found to be a practical upper limit.

The foam may be prepared in a planetary mixer such as a Hobart mixer or in a foam generator, a standard article of commerce, using air, water, and foaming agent, as is well known in the art. The only special requirement for this invention is that the foam be prepared with a minimum amount of water: it will have a maximum density of about 5 pcf (80 g/l). Since the foam should be fairly uniform in structure, a density of 1 pcf (16 g/l) will be a practical minimum. Foams of about 2 pcf (32 g/l) density have been found to work quite well in the practice of this invention.

The slip and the foam can be mixed in any of various standard pieces of equipment, for example a V-blender, a plaster mixer, a paddle mixer, or a planetary mixer. It will be evident that the relative amounts of slip and foam used will depend on the density desired in the finished product, less foam being used when a higher density product is desired. The exact proportions needed to achieve any given density will depend on the specific gravities of the solid materials used. However, in general the proportions of the two will range from 0.25 volume to 3 volumes of foam for every volume of slip.

The foamed slurry is then poured into molds where it will be cured for from 16 to 24 hours at a temperature not exceeding 72° F. (20° C.). In fact, the foam and foamed slurry should at no time be allowed to reach a temperature above that specified. Higher temperatures decrease the stability of the foam and foamed slurry, causing premature collapse. The molds may be made of any suitable material, for example metal or cardboard or plastic. Preferably they are arranged so that at least the sides can be removed from the cast shapes after the 24 hour curing.

After curing, the shapes are dried. This may be at an elevated temperature, not greater than about 200° F. (about 93° C.). It has been found that denser foamed slurries can be dried at higher temperatures than lighter ones. For example, a foamed slurry designed to produce a final product of 30 pcf (0.48 g/cc) density should be dried at no more than 110° to 120° F. (43° to 49° C.), at which temperature it will dry within 24 hours, while a foamed slurry designed to produce a product of 60 pcf (0.96 g/cc) density can be dried at 160° to 170° F. (71° to 77° C.), within 16 hours or less. At this point the shapes will be completely dry and of adequate strength to be placed in a kiln or, for example, on a car which will carry them through a tunnel kiln for firing.

The exact firing temperature will depend on the solid ingredients used. As is well known in the art, refractories of higher $Al_2O_3$ content will generally be fired at higher temperatures. Examples of specific firing temperatures are given in the following examples.

It may be noted that the solids used in the practice of this invention have a density of about 180 pcf (2.9 g/cc); therefore, a density of 60 pcf (0.96 g/cc) in the final fired insulating brick means that the brick is two-thirds, or 67 volume percent, pores. Similarly, a fired density of 30 pcf (0.48 g/cc) means that the refractory is five-sixths, or 83 volume percent, pores.

As will be evident from the following examples, the method of this invention permits the forming of an insulating refractory shape which, although it has less than half the density of a "dense" fireclay refractory (normally about 10 to 20 volume percent pores), exhibits a cold-crushing strength equal to that of the "dense" refractory.

EXAMPLES

In Table I are shown several mixes designed to be used at operating temperatures up to 2600° F. (about 1430° C.). In each case, the slip was prepared from 50 parts by weight calcined fireclay grog containing 40% $Al_2O_3$, substantially all of the grog passing a 28 mesh screen and about 80% passing a 200 mesh screen, 20 parts by weight plastic fireclay, 20 parts by weight calcined alumina of the type sold by Kaiser Aluminum & Chemical Corporation under the name C5R, and 10 parts by weight of the calcium aluminate cement sold by Aluminum Company of America under the name CA-25, together with the indicated percent (by weight, based on the total weight of dry ingredients) of water and 0.1 part by weight sodium citrate deflocculent. From the chemical analyses of these ingredients, it was determined that the fired mixes would have approximately the following chemical analysis: 55.4% $Al_2O_3$, 38.2% $SiO_2$, 1.6% $Fe_2O_3$, 1.4% $TiO_2$, 2.2% $CaO$, 0.2% $MgO$ and 1.0% alkali ($Na_2O$, $K_2O$, etc.). The different amounts of water were used in order to achieve different viscosities in the final foamed slurries.

The foam used in each mix was prepared in a planetary mixer, Model N50, sold by Hobart Mfg. Co., using 4% by weight of the unaerated liquid (water plus foaming agent) of Mearecel 3503, sold by Mearl Co., as foaming agent. In each case the foam had a density of 2 pcf (32 g/l).

One volume of the slip was admixed with the volumes of foam indicated in Table I in a planetary mixer for about 15 minutes. The viscosity given in Table I is for the foamed slurry and is in centipoises (cps). The foamed slurries were then cast into molds 12" (30 cm) on a side and 4 to 5" (10 to 13 cm) deep. The molds were epoxy coated aluminum sides set on a plastic film base. After the cast pieces had cured in the molds overnight at room temperature (about 20° C.) the sides of the molds were removed and the pieces left on the thin plastic sheet substrate at ambient conditions for another 5 days. The pieces were then removed from the substrates and fired to cone 16 (about 1450° C.). The various pieces exhibited drying shrinkages of approximately 2% and firing shrinkages of approximately 7.5%.

TABLE I

| Mix | $H_2O$ (%) | Vol Foam | Viscosity (cps) | Fired Density (pcf) | Density (g/cc) | Linear Change (%) | MOR (psi) | MOR (kg/cm²) | CCS (psi) | CCS (kg/cm²) |
| --- | --- | --- | --- | --- | --- | --- | --- | --- | --- | --- |
| 1 | 38.8 | 2.0 | 8500 | 29 | 0.47 | −0.6 | 294 | 20.7 | 327 | 23.0 |
| 2A | 38.8 | 1.3 | 4000 | 39 | 0.63 | −0.7 | 293 | 20.6 | 1029 | 72.3 |
| B | 36.6 | 1.3 | 4000 | 38 | 0.61 | −0.8 | 295 | 20.7 | 989 | 69.5 |
| C | 33.3 | 1.3 | 5400 | 39 | 0.63 | −0.6 | 300 | 21.1 | 1118 | 78.5 |
| D | 30.7 | 1.3 | 7800 | 41 | 0.66 | −0.6 | 306 | 21.5 | 1413 | 99.4 |
| 3A | 33.3 | 1.0 | 3400 | 45 | 0.72 | −0.4 | 363 | 25.5 | 1738 | 122 |
| B | 32.0 | 1.0 | 9000 | 47 | 0.75 | −0.5 | 382 | 26.8 | 1694 | 119 |
| C | 30.7 | 1.0 | 5200 | 47 | 0.75 | −0.3 | 456 | 32.0 | 2377 | 167 |
| D | 29.3 | 1.0 | 11000 | 49 | 0.79 | −0.4 | 413 | 29.0 | 2061 | 145 |
| 4A | 30.7 | 0.7 | 2200 | 60 | 0.96 | −0.5 | 740 | 52.0 | 3752 | 264 |
| B | 28.0 | 0.7 | 5600 | 61 | 0.98 | −0.4 | 754 | 53.0 | 3123 | 220 |
| C | 26.7 | 0.7 | 7600 | 63 | 1.01 | −0.2 | 770 | 54.0 | 4416 | 310 |
| D | 25.3 | 0.7 | 11000 | 64 | 1.03 | −0.4 | 851 | 59.8 | 4200 | 295 |

The fired pieces were cut into brick 9 by 4.5 by 2.5 inches (23×11.5×6.4 cm) on a side, and these brick subjected to various tests with the results indicated in Table I.

The fired density was determined by weighing the brick and measuring their dimensions. The linear change was determined after heating the fired bricks, at a rate of 400° C. per hour, to 1400° C., holding at that temperature for 24 hours, and cooling to room temperature. The modulus of rupture (MOR) was determined on the full brick at room temperature by ASTM C93-67 in three point loading (7 inch—about 18 cm—span). The cold crushing strength (CCS) was also determined by ASTM Method C93-67 at room temperature on specimens about 4.5 by 4 by 2.5 inches (11.5×10×6.4 cm) cut from the broken MOR specimens. The brick made from Mix I had a thermal conductivity of 0.92 Btu-in/° F.-hr-ft² (0.13 watts/m° C.).

The preceding results can be compared with the properties of a superduty fireclay brick having a bulk density of 145 pcf (2.3 g/cc) (about 11% porosity). A typical brick of this type exhibits linear change upon reheat to 1500° C. of from −0.2 (i.e., shrinkage) to +0.5% (i.e., expansion), has a modulus of rupture from around 1000 to 1500 psi (70 to 100 kg/cm$^2$) and cold crushing strengths of from 2000 to 3500 psi (140 to 250 kg/cm$^2$). Its thermal conductivity is about 8 Btu-in/° F.-hr-ft$^2$ (1.1 watts/m° C.). Thus, it can be seen that a mix such as 4 A, B, C, or D according to this invention has cold crushing strengths exceeding that of the super-duty brick, a modulus of rupture approaching that of the super-duty brick, and yet, because of its much lower density, should have less than a quarter the thermal conductivity (about 1.8 Btu-in/° F.-hr-ft$^2$ or 0.26 watts/m° C.). The heat savings to be realized in a furnace constructed with bricks such as those made from mixes 4 A, B, C, and D are obvious.

Another comparison of the brick according to this invention can be made with conventional insulating brick made with a sawdust burnout material. Such brick typically have a bulk density of 50 pcf (0.80 g/cc), a linear change on heating to 1400° C. of −0.2%, modulus of rupture from 200 psi (14 kg/cm$^2$), cold crushing strength of 200 psi (14 kg/cm$^2$), and thermal conductivity of 1.45 Btu-in/° F.-hr-ft$^2$ (0.21 watts/m° C.). Thus, from this point of view, brick made according to the present invention can have densities and thermal conductivities equivalent to conventional 2600° F. (1430° C.) insulating brick, but twice their modulus of rupture and about ten times their cold crushing strength.

Set forth in Table II are various mixes designed for use at operating temperatures up to 2300° F. (about 1260° C.). These mixes illustrate the use of different types and amounts of solid raw materials. Aggregate A is the pulverized fireclay grog used in the mixes of Table I and Aggregate B is the same material ballmilled so that 90% passed a 325 mesh screen. Clay D is the same pulverized plastic fireclay used in the mixes of Table I, whereas Clay E is a ballmilled semi-plastic Missouri fireclay, and Clay F is an air floated kaolin clay. Cement H is the same CA-25 cement used in the mixes of Table I, Cement J is a lower purity calcium aluminate cement sold by Universal Atlas under the name Refcon. Cement K is an even lower purity calcium aluminate cement sold by Universal Atlas under the name Lumnite, and Cement L is an equivalent cement sold by Lone Star Lafarge under the name Fondu.

The indicated weight portions of the different ingredients were blended with 38.8% water (by weight, based on the total weight of dry ingredients) and the indicated percentage of sodium citrate as defloculant to form the slip. One volume of this slip was mixed with the indicated volume of the same two pcf foam used in the mixes of Table I. The viscosity, in centipoises, of the foamed slurry is indicated in Table II.

The foamed slurries were cast into the same molds used in the examles of Table I and subjected to the same curing and drying treatment. The drying shrinkages given in Table II are averages over both vertical and horizontal dimensions of at least two pieces.

After firing to the temperatures indicated in Table III, the pieces had the properties indicated in that Table.

In the specification and claims, percentages and parts are by weight unless otherwise indicated, except that porosities are expressed in volume percent. Mesh sizes referred to herein are Tyler standard screen sizes which are defined in Chemical Engineers' Handbook, John H. Perry, Editor-in-Chief, Third Edition 1950, published by McGraw Hill Book Company, at page 963. For example, a 200 mesh screen opening corresponds to 74 microns. Analyses of mineral components are reported in the usual manner, expressed as simple oxides, e.g. Al$_2$O$_3$ and SiO$_2$, although the components may actually be present in various combinations, e.g. as an aluminosilicate. Cone numbers used refer to the Standard Pyrometric Cones (manufactured by Edward S. Orton Ceramic Foundation) used to measure the combined effect of time and temperature in the firing of ceramic products. Thus, for example, "cone 16" represents a heating to 2651° F. (1450° C.) at a rate of 108° F. (60° C.) per hour which is equivalent to a heating to 2683° F. (1470° C.) at a rate of 270° F. (150° C.) per hour. Viscosities were measured on a Brookfield rotational viscometer Model RVT at 5 rpm.

What is claimed is:

1. In the method of making an insulating refractory shape by: (a) preparing a slip of water, deflocculating agent, finely divided solid refractory particles, and binder; (b) preparing a foam of water, air, and foaming agent; (c) admixing the slip and the foam to produce a foamed slurry; (d) casting the slurry into molds; (e) curing and (f) drying the cast pieces so formed; and (g) firing the pieces, the improvement wherein: (1) the slip consists essentially of at least 7.5% cement, from 0 to 50% clay, the balance of the solid ingredients being refractory aggregate all of which passes a 28 mesh screen, all percentages being by weight and based on the total weight of dry solid ingredients, and sufficient water to produce, when mixed with the foam, a foamed

TABLE II

| Mix | Aggregate Type | Amt | Clay Type | Amt | Cement Type | Amt | Deflocc | Vol Foam | Viscosity (cps) | Drying Shrinkage (%) |
|---|---|---|---|---|---|---|---|---|---|---|
| 5 | A | 70 | F | 20 | J | 10 | 0.15 | 2.5 | 6200 | 5.6 |
| 6 | B | 80 | E | 10 | H | 10 | 0.1 | 2.0 | 9800 | 2.2 |
| 7 | A | 70 | F | 20 | L | 10 | 0.15 | 2.0 | 11000 | 3.2 |
| 8 | A | 60 | D | 20 | K | 20 | 0.5 | 2.0 | 8600 | 3.0 |

TABLE III

| Mix | T$_f$ (°C.) | Shrinkage (%) | Density (pcf) | Density (g/cc) | MOR (psi) | MOR (kg/cm$^2$) | CCS (psi) | CCS (kg/cm$^2$) | Linear Change (%) |
|---|---|---|---|---|---|---|---|---|---|
| 5 | 1265 | 8.6 | 27 | 0.43 | 92 | 6.5 | 167 | 11.7 | −0.2 |
| 6 | 1290 | 9.8 | 33 | 0.53 | — | — | — | — | — |
| 7 | 1265 | 9.9 | 35 | 0.56 | 212 | 14.9 | 464 | 32.6 | −0.1 |
| 8 | 1290 | 9.3 | 33 | 0.53 | — | — | — | — | — | slurry having a viscosity of from 1000 to 30,000 centipoises; (2) the foam has a density of not over about 5 pcf; (3) the slip and the foam are admixed in the proportion of from 0.25 volume to 3 volumes of foam for each volume of slip; (4) the cast foamed slurry is cured at a temperature of not over about 72° F. for from 16 to 24 hours and then (5) dried at a temperature of not over about 200° F.

2. Method according to claim 1 wherein the refractory aggregate is one or more of: calcined clay, refractory grog, calcined bauxite, and alumina.

3. Method according to claim 2 wherein the slip has about 10% cement, 20% clay, and 70% aggregate, the foam has a density of not over 3 pcf, and the foamed slurry has a viscosity of from 5000 to 12,000 centipoises.

4. Method according to claim 3 wherein the aggregate is made up of 20% alumina and 50% refractory grog.

5. Method according to claims 1, 2, 3, or 4 wherein the cement is calcium aluminate cement.

6. Method according to claim 5 wherein the cement is high alumina calcium aluminate cement.

7. Method according to claim 4 wherein the cement is high alumina calcium aluminate cement and the cast and dried pieces are fired at a temperature of about 1450° C.

8. Method according to claims 1, 2, 3, 4 or 7 wherein 1 volume of slip is admixed with about 2 volumes of foam.

9. Method according to claims 1, 2, 3, 4 or 7 wherein 1 volume of slip is admixed with about two-thirds of a volume of foam.

* * * * *